(12) United States Patent
Fanebost et al.

(10) Patent No.: US 9,094,236 B2
(45) Date of Patent: Jul. 28, 2015

(54) METHODS, SYSTEMS, AND COMPUTER PROGRAM PRODUCTS FOR COLLABORATIVE JUNK MAIL FILTERING

(75) Inventors: Lars Fanebost, Nesoddtangen (NO); Tom Rojahn, Oslo (NO); Tryggve E. Sorensen, Tarnasen (NO); Tore Stokkedal, Oslo (NO)

(73) Assignee: International Business Machines Corporation, Armonk, NY (US)

( * ) Notice: Subject to any disclaimer, the term of this patent is extended or adjusted under 35 U.S.C. 154(b) by 1199 days.

(21) Appl. No.: 12/136,801

(22) Filed: Jun. 11, 2008

(65) Prior Publication Data
US 2009/0313333 A1 Dec. 17, 2009

(51) Int. Cl.
G06F 15/16 (2006.01)
H04L 12/58 (2006.01)
G06Q 10/10 (2012.01)

(52) U.S. Cl.
CPC ............ *H04L 12/585* (2013.01); *G06Q 10/107* (2013.01); *H04L 51/12* (2013.01)

(58) Field of Classification Search
CPC ... H04L 12/585; H04L 12/5855; H04L 51/12; H04L 51/14; H04L 67/306; G06Q 10/107; G06Q 50/01
USPC .......................................... 709/206; 715/752
See application file for complete search history.

(56) References Cited

U.S. PATENT DOCUMENTS

| | | | |
|---|---|---|---|
| 5,905,777 A * | 5/1999 | Foladare et al. ............ | 379/90.01 |
| 6,249,805 B1 * | 6/2001 | Fleming, III .................. | 709/206 |
| 6,421,709 B1 * | 7/2002 | McCormick et al. ......... | 709/206 |
| 6,453,327 B1 * | 9/2002 | Nielsen .......................... | 715/205 |
| 6,732,157 B1 * | 5/2004 | Gordon et al. ................ | 709/206 |
| 7,287,060 B1 * | 10/2007 | McCown et al. .............. | 709/206 |
| 7,359,941 B2 * | 4/2008 | Doan et al. .................... | 709/205 |
| 7,366,761 B2 * | 4/2008 | Murray et al. ................ | 709/206 |
| 7,698,442 B1 * | 4/2010 | Krishnamurthy et al. .... | 709/229 |
| 7,814,545 B2 * | 10/2010 | Oliver et al. ..................... | 726/22 |
| 2002/0059454 A1 * | 5/2002 | Barrett et al. ................. | 709/245 |
| 2003/0187942 A1 * | 10/2003 | Quine et al. ................... | 709/207 |
| 2003/0212791 A1 * | 11/2003 | Pickup .......................... | 709/225 |
| 2004/0019651 A1 * | 1/2004 | Andaker ....................... | 709/207 |
| 2004/0083270 A1 * | 4/2004 | Heckerman et al. .......... | 709/207 |

(Continued)

OTHER PUBLICATIONS

Garg, Anurag et al., "'May I Borrow Your Filter?' Exchanging Filters to Combat Spam in a Community," Nov. 2005, University of Trento, Technical Report #DIT-05-089, pp. 3-16.*

(Continued)

*Primary Examiner* — Christopher Biagini
(74) *Attorney, Agent, or Firm* — Cantor Colburn LLP; Daniel Simek

(57) ABSTRACT

A method, system and computer program product for collaborative filtering of junk electronic mail (e-mail) are provided. The method includes receiving an e-mail message at a service provider, where the e-mail message includes a source address and a recipient address. The method further includes searching a collaborative junk register (CJR) for the recipient address in a group member list, where the group member list includes multiple member addresses and a junk address. The method additionally includes comparing the source address to the junk address. The method also includes filtering the e-mail message at the service provider to prevent delivery of the e-mail message in response to locating the recipient address in the CJR and identifying source address as the junk address.

18 Claims, 4 Drawing Sheets

(56) References Cited

U.S. PATENT DOCUMENTS

| | | | |
|---|---|---|---|
| 2004/0177120 A1* | 9/2004 | Kirsch | 709/206 |
| 2005/0015456 A1* | 1/2005 | Martinson, Jr. | 709/207 |
| 2005/0080856 A1* | 4/2005 | Kirsch | 709/206 |
| 2005/0080857 A1* | 4/2005 | Kirsch et al. | 709/206 |
| 2005/0091319 A1* | 4/2005 | Kirsch | 709/206 |
| 2005/0091320 A1* | 4/2005 | Kirsch et al. | 709/206 |
| 2005/0114452 A1 | 5/2005 | Prakash | |
| 2005/0188044 A1* | 8/2005 | Fleming, III | 709/206 |
| 2005/0246420 A1* | 11/2005 | Little, II | 709/204 |
| 2006/0010210 A1* | 1/2006 | Keller | 709/206 |
| 2006/0095966 A1* | 5/2006 | Park | 726/22 |
| 2007/0005714 A1* | 1/2007 | LeVasseur et al. | 709/206 |
| 2008/0097946 A1* | 4/2008 | Oliver et al. | 706/46 |
| 2008/0104186 A1* | 5/2008 | Wieneke et al. | 709/206 |
| 2009/0019126 A1* | 1/2009 | Adkins | 709/206 |
| 2010/0153500 A1* | 6/2010 | O'Sullivan et al. | 709/206 |

OTHER PUBLICATIONS

Gray, Alan and Mads Haahr, "Personalised, Collaborative Spam Filtering," 2004, Distributed Systems Group, Department of Computer Science, Trinity College Dublin, Ireland, pp. 1-8.*

Joseph S. Kong, et al., Collaborative Spam Filtering Using E-Mail Networks, Computer, Aug. 2006, pp. 67-73.

Alan Gray, et al., Personalized, Collaborative Spam Filtering, Distributed Systems, Group, Department of Computer Science, Trinity College Dublin, Ireland, http://ceas.cc/papers-2004/132.pdf, 8 pages.

Joseph S. Kong, et al., Let Your CyberAlter Ego Share Information and Manage Spam, http://arxiv.org/PS_cache/physics/pdf/0504/0504026v2.pdf, May 7, 2005, 13 pages.

Seungyeop Han, et al., Collaborative Blog Spam Filtering Using Adaptive Percolation Search, WWW2006, May 22-26, 2006, Edinburgh, UK, 6 pages.

Paul-Alexandru Chirita, et al., MailRank: Using Ranking for Spam Detection, CIKM '05 Bremen, Germany, 8 pages.

* cited by examiner

GROUP MEMBER LIST 200

| Group | Type | Member Address | Originator | Junk Address | Agree |
|---|---|---|---|---|---|
| Smith_Family | Private  214 | JSmith@example.com<br>DSmith@example.com<br>ESmith@example.com | JSmith@example.com | EDT@PoliticalViews.org | Y |
| Book Club | Public  216 | AReader@example.com<br>BReader@example.com<br>IReadit@example.com<br>JSmith@example.com | AReader@example.com<br>BReader@example.com<br>IReadit@example.com<br>JSmith@example.com | *@BadBookCritic.com | Y<br>N<br>Y<br>Y |
|  |  | AReader@example.com<br>BReader@example.com<br>IReadit@example.com<br>JSmith@example.com | BReader@example.com<br>IReadit@example.com | *Religion:* | Y<br>Y |

METHODS, SYSTEMS, AND COMPUTER PROGRAM PRODUCTS FOR COLLABORATIVE JUNK MAIL FILTERING

BACKGROUND OF THE INVENTION

1. Field of Invention

The present invention relates generally to electronic mail management, and, in particular, to collaborative junk filtering of electronic mail at a service provider.

2. Description of Background

Present electronic mail services offered by Internet service providers (ISPs) are typically protected, to a certain level, from being attacked by vicious and malicious viruses, Trojan horses etc. However, only a very limited extent of protection is presently provided from meaningless spam and propositions from nonexistent enterprises and people who are trying to take advantage of electronic mail subscribers and/or infect their mailboxes. These protection mechanisms include virus detection in firewalls, virus scans on personal computers, and junk mail filters on local electronic mail clients. Another example of an approach to assist in detecting false identities in electronic mail is DomainKeys Identified Mail (DKIM), which allows electronic mail senders to "sign" each electronic mail message to verify that it comes from their domain. If the receiving domain handles an electronic mail message that does not contain the signature, it can raise a red flag to warn the recipient that the message might be a fake. These various protection and alerting schemes have a common objective of reducing the danger of being infected by malicious viruses, as well as reducing the amount of junk mail; nevertheless, electronic mail box users world-wide are being overloaded with unwanted junk mail every day.

It is not only electronic mail messages composed by fictive users at various domains, but also actual users at real domains, which jam electronic mail boxes with spam and must be screened by a user before it can be categorized as junk. For example, legitimate organizations can generate a large volume of electronic mail but be non-responsive to requests to "unsubscribe" users from the associated mailing lists. Some users may desire the electronic mail messages, while others find them a nuisance. Since categorizing these types of messages as junk or not junk is a matter of individual preference, ISPs cannot apply wide-scale filtering to eliminate the messages. Many users that are connected by some common characteristic (such as a family, a profession, a religion, a political view, and the like) may have common views as to what types of messages they consider to be junk. Therefore, it would be beneficial to develop a system that applies a collaborative community approach to reduce junk mail. Such an approach would be implemented at a higher-level service provider, e.g., at an ISP, to provide many users access and prevent unsecured junk mail from reaching client systems of the individual users. Accordingly, there is a need in the art for collaborative filtering of junk electronic mail.

BRIEF SUMMARY OF THE INVENTION

An exemplary embodiment is a method for collaborative filtering of junk electronic mail (e-mail). The method includes receiving an e-mail message at a service provider, where the e-mail message includes a source address and a recipient address. The method further includes searching a collaborative junk register (CJR) for the recipient address in a group member list, where the group member list includes multiple member addresses and a junk address. The method additionally includes comparing the source address to the junk address. The method also includes filtering the e-mail message at the service provider to prevent delivery of the e-mail message in response to locating the recipient address in the CJR and identifying source address as the junk address.

Another exemplary embodiment is a system for collaborative filtering of junk e-mail. The system includes a mail transport agent (MTA) to receive an e-mail message on a host system at a service provider, where the e-mail message includes a source address and a recipient address. The system also includes a collaborative junk filtering (CJF) application executing on the host system. The CJF application searches a CJR for the recipient address in a group member list, where the group member list includes multiple member addresses and a junk address. The CJF application compares the source address to the junk address and filters the e-mail message to prevent delivery of the e-mail message to a client system in response to locating the recipient address in the CJR and identifying source address as the junk address.

A further exemplary embodiment is a computer program product for collaborative filtering of junk e-mail. The computer program product includes a storage medium readable by a processing circuit and storing instructions for execution by the processing circuit for implementing a method. The method includes receiving an e-mail message at a service provider, where the e-mail message comprises a source address and a recipient address. The method also includes searching a CJR for the recipient address in a group member list, where the group member list includes multiple member addresses and a junk address. The method further includes comparing the source address to the junk address, and filtering the e-mail message at the service provider to prevent delivery of the e-mail message in response to locating the recipient address in the CJR and identifying source address as the junk address.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as a preferred embodiment of the present invention is particularly pointed out and distinctly claimed in the claims at the conclusion of the specification. The foregoing and other objects, features, and advantages of the invention are apparent from the following detailed description taken in conjunction with the accompanying drawings in which:

FIG. 2 depicts an example of a group member list in a collaborative junk register in accordance with exemplary embodiments;

The detailed description explains the preferred embodiments of the invention, together with advantages and features, by way of example with reference to the drawings.

DETAILED DESCRIPTION OF THE INVENTION

Exemplary embodiments provide collaborative filtering of junk electronic mail (e-mail). In exemplary embodiments, a collaborative junk register (CJR) is maintained at a service provider, such as an Internet service provider (ISP), to store information used to identify whether an e-mail message received at the ISP targeting a recipient address should be classified as "junk". The CJR includes a group member list that defines public and private groups of members and one or more junk addresses associated with each group. Thus, members can either establish their own personal list of junk addresses or join a group that shares a common characteristic to take advantage of the knowledge and experience of the group collaboratively. Members can join multiple groups that correspond to their various interests (e.g., political, religious, professional, etc.).

The CJR is configurable to add groups and modify existing groups. A CJR user can login to a secure web application and insert a junk address into a group. When an e-mail message is received at the ISP with a source address that matches the junk address, which may include wildcards (e.g., "*" replacing any number of characters or symbols), the content of the e-mail is replaced with a link and sent to members of the group. The recipients may individually inspect the content over a secure website and determine whether they agree that the message is junk. Upon agreeing that the message is junk, the CJR is updated, and any email from the junk address is deleted/trashed at the ISP, until the source address is no longer considered to be a junk address. For instance, a recipient of advertisements from certain retailers may desire to see promotional e-mail messages around holidays, birthdays, or special occasions, but prefer to have the messages filtered at other times of the year.

Figure 1:
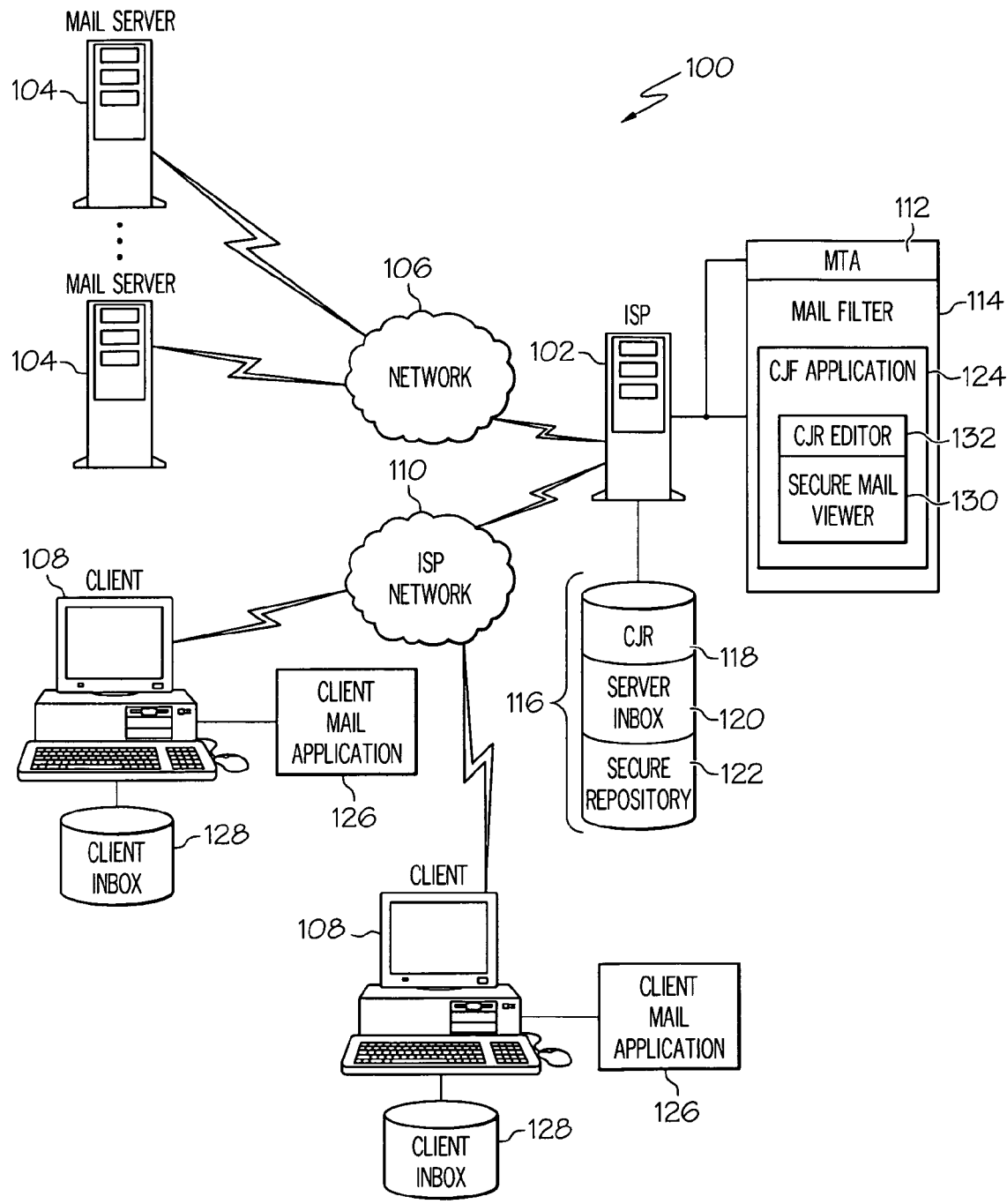
FIG. 1 depicts a system for collaborative filtering of junk electronic mail in accordance with exemplary embodiments.

Turning now to the drawings, it will be seen that in FIG. 1 there is a block diagram of a system 100 upon which collaborative filtering of junk e-mail is implemented in exemplary embodiments. The system 100 of FIG. 1 includes a host system 102 at a service provider (e.g., an ISP) in communication with mail servers 104 over a network 106. In exemplary embodiments, the host system 102 is a high-speed processing device (e.g., a server computer) including at least one processing circuit (e.g., a CPU) capable of reading and executing instructions, and handling numerous e-mail messages from the mail servers 104 as well as interaction requests from client systems 108 via a service provider network 110. The host system 102 may perform as a Web server, an e-mail server, and a firewall for the client systems 108. The host system 102 can execute a variety of applications, such as a mail transport agent (MTA) 112 and a mail filter 114.

The mail servers 104 may be various computers that send e-mail messages targeting users of the client systems 108 as recipients. In exemplary embodiments, the client systems 108 comprise desktop, laptop, general-purpose computer devices, and/or I/O devices, such as keyboard and display devices, which provide interfaces for communicating with the host system 102. Users of the client systems 108 can send and receive e-mail via the host system 102, as well as access websites and web applications.

While only a single host system 102 is shown in FIG. 1, it will be understood that multiple host systems can be implemented, each in communication with one another via direct coupling or via one or more networks. For example, multiple host systems may be interconnected through a distributed network architecture. The single host system 102 may also represent a cluster of hosts collectively performing processes as described in greater detail herein.

The network 106 and the service provider network 110 may be any type of communications networks known in the art. For example, the network 106 and the service provider network 110 may be intranets, extranets, or internetworks, such as the Internet, or a combination thereof. The network 106 and the service provider network 110 can include wireless, wired, and/or fiber optic links. The network 106 and the service provider network 110 can be parts of a larger network; however, access between the mail servers 104 and the client systems 108 is buffered by the host system 102.

In exemplary embodiments, the host system 102 accesses and stores data on a data storage device 116. The data storage device 116 refers to any type of computer readable storage medium and may comprise a secondary storage element, e.g., hard disk drive (HDD), tape, or a storage subsystem that is internal or external to the host system 102. Types of data that may be stored in the data storage device 116 include, for example, various files and databases. It will be understood that the data storage device 116 shown in FIG. 1 is provided for purposes of simplification and ease of explanation and is not to be construed as limiting in scope. To the contrary, there may be multiple data storage devices 116 utilized by the host system 102.

In exemplary embodiments, the data storage device 116 includes a CJR 118, a server inbox 120 and a secure repository 122. The CJR 118 can include one or more group member lists that define junk e-mail filtering rules for collaborative groups of members. An example of a group member list 200 is depicted in FIG. 2, with fields such as: group 202, type 204, member address 206, originator 208, junk address 210, and agree 212 populated with data values. The server inbox 120 of FIG. 1 holds e-mail that has been received via the MTA 112 and passed through the mail filter 114. The mail filter 114 can include or call a collaborative junk filtering (CJF) application 124 to apply the CJR 118 to messages received prior to writing them to the server inbox 120. In response to detecting a source address in an e-mail message directed to a recipient address that matches a junk address 210 and corresponding member address 206, the CJF application 124 can extract the contents of the message and write it to the secure repository 122. Alternatively, if the recipient address is an originator 208 and has agreed that mail from the junk address 210 is junk (agree 212 set true/yes), then the CJF application 124 can delete the junk message without further notification to the recipient. A member gains originator status by establishing that an e-mail address, or some portion thereof, is a junk address.

Users of the client systems 108 may utilize client mail applications 126 to interface with the host system 102. Each client mail application 126 can request e-mail messages from the server inbox 120 corresponding to the recipient address of the particular user. If the CJF application 124 has copied the contents of a message to the secure repository 122, then a new e-mail message with a link to the contents in the secure repository 122 is transferred from the server inbox 120 to a client inbox 128 upon checking for new mail. The client mail application 126 or an alternate application (e.g., a web browser) can be used to view the contents in the secure repository 122. In exemplary embodiments, a secure mail viewer 130 is used to view contents in the secure repository 122. Viewing the message contents in this manner prevents attached viruses, worms, Trojan horses, and the like from gaining direct access to the client systems 108, where potentially harmful processes could be executed. In this secure environment, a user can safely examine message contents in the secure repository 122 to determine whether this is junk mail and/or potentially harmful mail.

The client systems 108 can also initiate updates to the CJR 118 using CJR editor 132. The CJR editor 132 allows users to configure groups, including: creating, joining, or modifying public and private groups. Public groups may be open to a variety of members, while membership is restricted in private groups. For example, private group 214 of FIG. 2 is a family group, while public group 216 applies to a wider collaborative group. Private groups can be limited in visibility to prevent non-members of the private groups from viewing group settings and attributes, as well as preventing others from joining. Public groups may be joined, viewed, and configured by a wider body of users.

Figure 3:
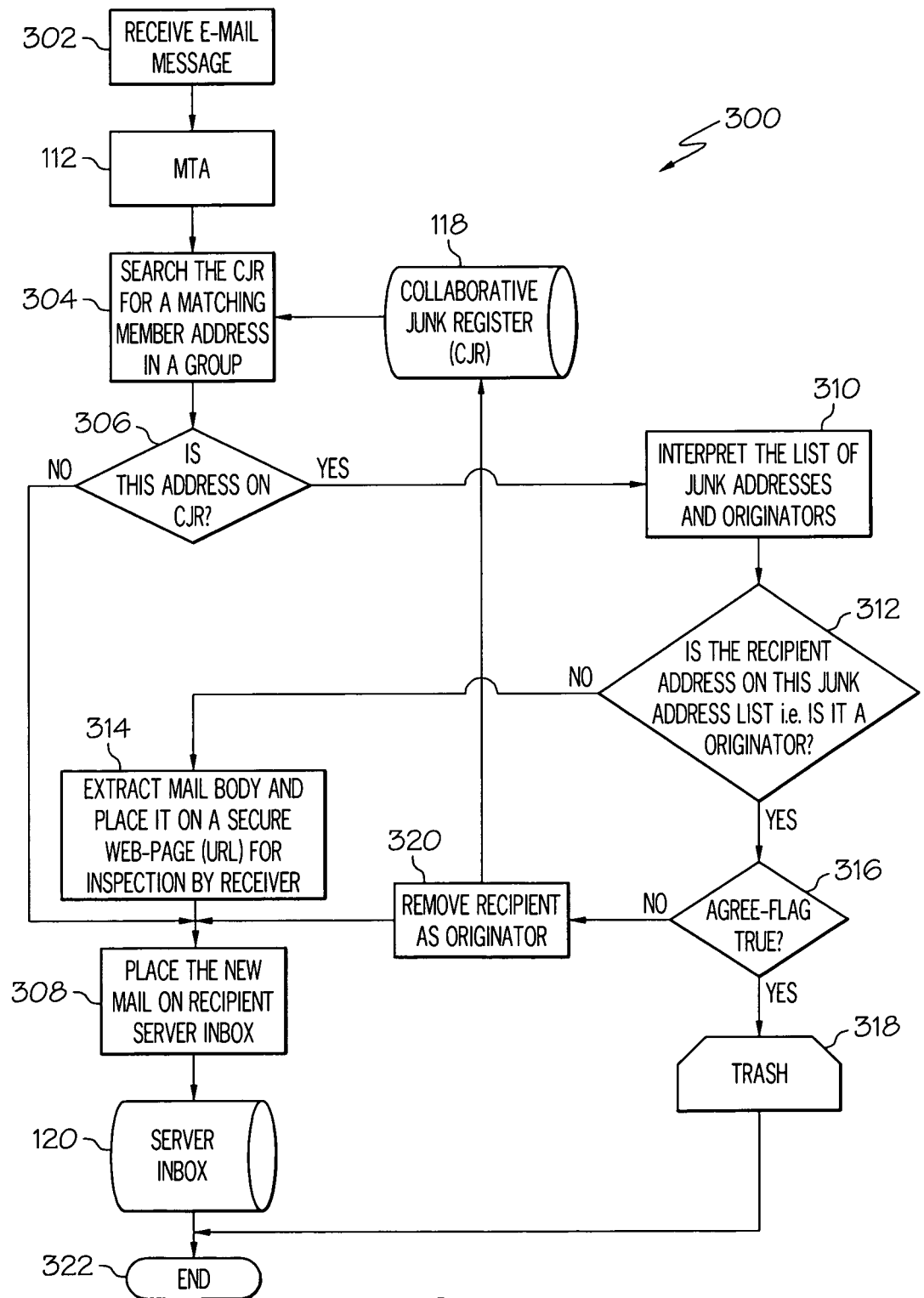
FIG. 3 depicts an exemplary process for collaborative filtering of junk electronic mail in accordance with exemplary embodiments.

Turning now to FIG. 3, a process 300 for collaborative filtering of junk e-mail will now be described in accordance with exemplary embodiments, and in reference to FIGS. 1 and 2. At block 302, an e-mail message is received at the host system 102, which executes the MTA 112 to process the message. The MTA 112 can utilize the mail filter 114 to check whether the message is a junk message. The mail filter 114 may apply both standard verification processes to filter out messages from illegitimate domains as well as content filtering. To provide additional filtering of messages that originate from valid domains and are not otherwise blocked, the mail filter 114 initiates the CJF application 124. The CJF application 124 examines the received e-mail message to determine the source address and the recipient address of the message. At blocks 304 and 306 searching of the CJR 118 is performed to determine if the recipient address is in the group member list 200. If there is no match, then the message is written to the server inbox 120 at block 308. If there is a match, the e-mail message is filtered at the service provider to prevent delivery of the e-mail message in response to locating the recipient address in the CJR 118 and identifying source address as one of the junk addresses 210.

At blocks 310 and 312, the junk addresses 210 and originators 208 are interpreted, comparing the source address to the junk addresses 210 and the recipient address to the originators 208. At block 314, upon determining that the recipient address is not designated as one of the originators 208 of the junk address 210 in the group member list 200, the e-mail message is replaced with a secured e-mail message as a new message stored in the server inbox 120. The secured e-mail message includes a link to a copy of the body of the original e-mail message stored in the secure repository 122. The link can be a uniform resource locator (URL) to access the content in the secure repository 122. At block 316, a determination is made as to whether the recipient address designated as the originator 208 has agreed that messages from the junk address 210 are junk mail based on the associated value of agree 212. If agree 212 is set (i.e., true/yes), then the message is sent to trash 318 (deleted); otherwise, the recipient address may be removed as the originator 208 at block 320, with a corresponding update to the CJR 118. This can be used to give users the ability to confirm that the junk address 210 is still considered junk/spam. In exemplary embodiments, when all group members determine that the junk address 210 is not junk (e.g., agree 212 for all group members is false/no), then the junk address 210 can be automatically deleted from the associated group 202. At block 322 processing ends.

Figure 4:
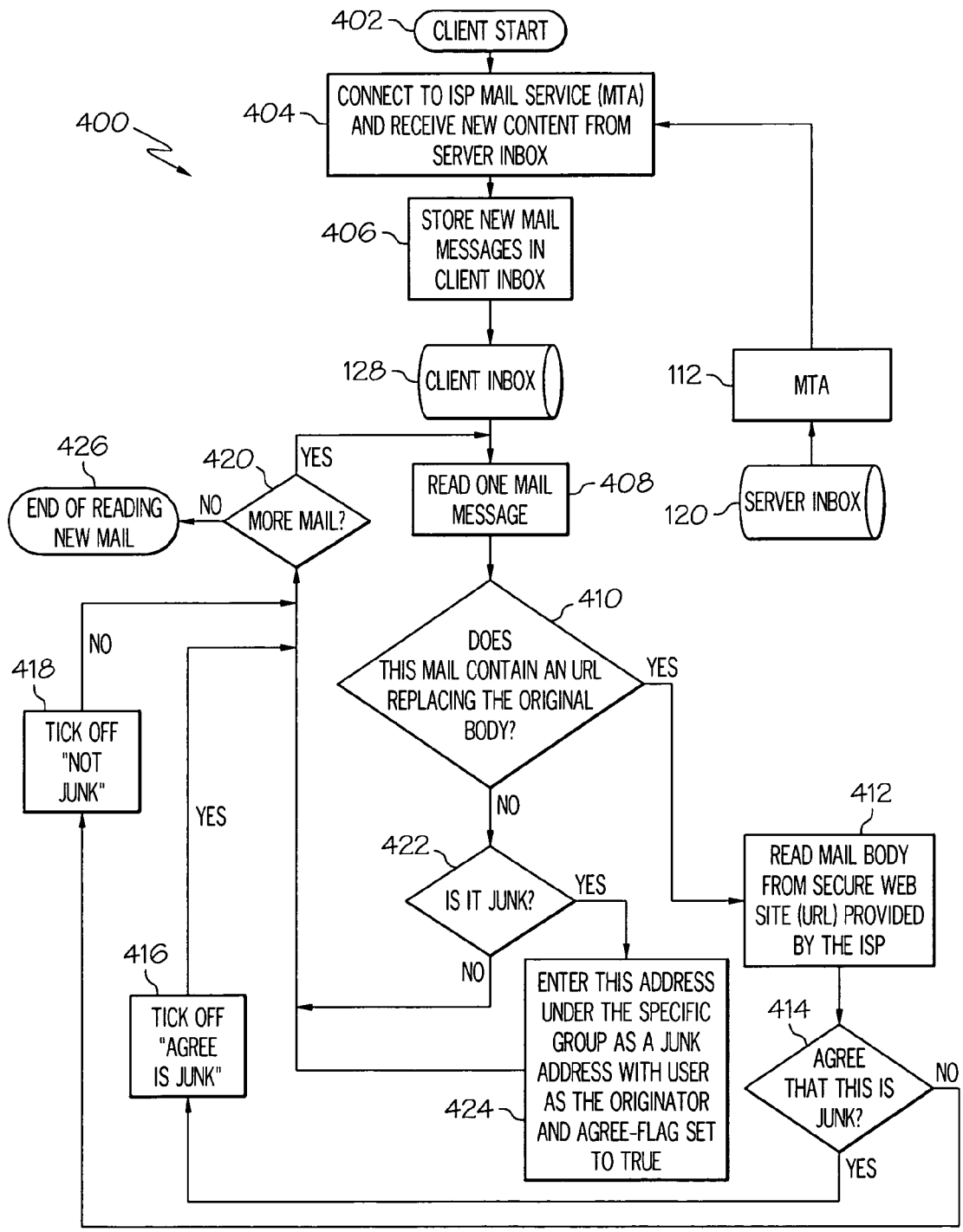
FIG. 4 depicts an exemplary process for user interactions to identify junk electronic mail in accordance with exemplary embodiments.

FIG. 4 depicts an exemplary process 400 for user interactions to identify junk e-mail in accordance with exemplary embodiments, and in reference to FIGS. 1 and 2. At block 402, a user initiates client mail application 126 on client system 108 to access e-mail from the host system 102. At block 404, the client system 108 connects to the MTA 112 and requests new content from the server inbox 120. At block 406 retrieved messages are sent to client inbox 128 of the client system 108. The user can use the client mail application 126 to read a mail message at block 408. At block 410, the user determines whether the mail message contains a link replacing the original body of the mail, i.e., it is a secured message modified by the CJF application 124. At block 412, the secure mail viewer 130 is used to read the content of the original message in the secure repository 122. At block 414, if the user agrees that the message is junk, then the user can tick-off, click on or otherwise indicate agreement depending upon the user interface design at block 416. The agreement status updates the value of agree 212 associated with the member and junk address 210 in the group member list 200 of the CJR 118. If the user does not agree that the message is junk, then the user can tick-off, click on or otherwise indicate disagreement depending upon the user interface design at block 418. At block 420, additional mail messages can be examined. If the mail message examined at block 410 is not a secured message, the user can determine upon examining the message as to whether the source address associated with the message should be classified as a junk address 210 at block 422. At block 424, if the message is junk, then the CJR 118 can be updated via the CJR editor 132. Upon reviewing the available new messages in the client inbox 128, the process 400 ends at block 426.

Technical effects and benefits of exemplary embodiments include collaborative filtering of junk e-mail at a service provider. Using public and/or private groups, members can join groups of other members that share a common interest, point-of-view, or other characteristic. Each group can identify one or more e-mail addresses, including partial addresses with wildcards, as junk addresses. Upon agreeing that messages from the junk addresses are junk, the messages are prevented from reaching the agreeing members. Otherwise, a secured copy of the message is delivered with a link to a secure repository holding a copy of the body of the message, which may be viewed remotely using a secure mail viewer. Members can modify their group membership, as well as changing their decisions as to whether a junk address should be classified as junk. This allows users to collaboratively decide on message sources to block and join groups that have already been established. Controlling junk mail filtering at the service provider prevents harmful junk messages from reaching the client systems in an unsecured state.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, universal serial bus (USB) flash drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for collaborative filtering of junk electronic mail (e-mail), comprising:
    establishing a group member list, the group member list comprising group members, the group members comprising users having e-mail addresses designated as multiple member addresses, the group members electing to join the group member list, the group member list further comprising the multiple member addresses of the group members;
    receiving an e-mail message at a service provider, wherein the e-mail message comprises a source address and a recipient address;
    searching a collaborative junk register (CJR) for the recipient address in the group member list, the CJR configurable by the group members using an editor and configured to associate the multiple member addresses with one or more junk addresses;
    comparing the source address to the one or more junk addresses; and
    filtering the e-mail message at the service provider prior to sending the e-mail message to any of the multiple member addresses in the group membership list to prevent delivery of the e-mail message to an email server in response to locating the recipient address in the group member list and identifying the source address as the one or more junk addresses, wherein the filtering further comprises:
        determining whether the recipient address is designated as an originator of the source address in the one or more junk addresses, wherein each member address in the group member list that classifies the source address as one of the one or more junk addresses is designated as the originator;
        replacing the e-mail message with a secured e-mail message as a new message in response to determining that the recipient address is not designated as the originator; and
        removing the source address from the one or more junk addresses in response to all of the member addresses in the group member list designated as the originator agreeing that messages from the source address are not junk mail.

2. The method of claim 1 wherein the filtering further comprises:
    storing the new message in a server inbox.

3. The method of claim 2 wherein the e-mail message further comprises a body, and the secured e-mail message includes a link to a copy of the body stored in a secure repository.

4. The method of claim 2 further comprising:
    determining whether the recipient address designated as the originator has agreed that messages from the one or more junk addresses are junk mail;
    deleting the e-mail message in response to determining that the recipient address designated as the originator has agreed; and
    removing the originator designation from the recipient address in response to determining that the recipient address designated as the originator has not agreed.

5. The method of claim 1 wherein the group member list further comprises a group type designation as public or private.

6. The method of claim 5 wherein the public group type designation permits any member to join the group member list and the private group type designation limits membership in the group member list.

7. The method of claim 1 wherein a mail client communicates with the service provider to configure the group member list.

8. A system for collaborative filtering of junk electronic mail (e-mail), the system comprising:
    a host system comprising a hardware processor, the host system further comprising:
        a mail transport agent (MTA) to receive an e-mail message on the host system at a service provider, wherein the e-mail message comprises a source address and a recipient address; and
        a collaborative junk filtering (CJF) application that executes on the hardware processor of the host system, wherein the CJF application performs a method comprising:
            establishing a group member list, the group member list comprising group members, the group members comprising users having e-mail addresses designated as multiple member addresses, the group members electing to join the group member list, the group member list further comprising the multiple member addresses of the group members;
            searching a collaborative junk register (CJR) for the recipient address in the group member list, the CJR configurable by the group members using an editor and configured to associate the multiple member addresses with one or more junk addresses;
            comparing the source address to the one or more junk addresses; and
            filtering the e-mail message prior to sending the e-mail message to any of the multiple member addresses in the group membership list to prevent delivery of the e-mail message to an email server in response to locating the recipient address in the group member list and identifying the source address as the one or more junk addresses, wherein the filtering further comprises:
                determining whether the recipient address is designated as an originator of the source address in the one or more junk addresses, wherein each member address in the group member list that classifies the source address as one of the one or more junk addresses is designated as the originator;
                replacing the e-mail message with a secured e-mail message as a new message in response to determining that the recipient address is not designated as the originator; and
                removing the source address from the one or more junk addresses in response to all of the member addresses in the group member list designated as the originator agreeing that messages from the source address are not junk mail.

9. The system of claim 8 wherein the filtering further comprises:
storing the new message in a server inbox.

10. The system of claim 9 wherein the e-mail message further comprises a body, and the secured e-mail message includes a link to a copy of the body stored in a secure repository.

11. The system of claim 9 wherein the method performed by the CJF application further comprises:
determining whether the recipient address designated as the originator has agreed that messages from the one or more junk addresses are junk mail;
deleting the e-mail message in response to determining that the recipient address designated as the originator has agreed; and
removing the originator designation from the recipient address in response to determining that the recipient address designated as the originator has not agreed.

12. The system of claim 8 wherein the group member list further comprises a group type designation as public or private, the public group type designation permits any member to join the group member list and the private group type designation limits membership in the group member list.

13. The system of claim 8 wherein a mail client communicates with the host system to configure the group member list.

14. A computer program product for collaborative filtering of junk electronic mail (e-mail), the computer program product comprising:
a non-transitory storage medium readable by a processing circuit and storing instructions for execution by the processing circuit for implementing a method, the method comprising:
establishing a group member list, the group member list comprising group members, the group members comprising users having e-mail addresses designated as multiple member addresses, the group members electing to join the group member list, the group member list further comprising the multiple member addresses of the group members;
receiving an e-mail message at a service provider, wherein the e-mail message comprises a source address and a recipient address;
searching a collaborative junk register (CJR) for the recipient address in the group member list, the CJR configurable by the group members using an editor and configured to associate the multiple member addresses with one or more junk addresses;
comparing the source address to the one or more junk addresses; and
filtering the e-mail message at the service provider prior to sending the e-mail message to any of the multiple member addresses in the group membership list to prevent delivery of the e-mail message to an email server in response to locating the recipient address in the group member list and identifying the source address as the one or more junk addresses, wherein the filtering further comprises:
determining whether the recipient address is designated as an originator of the source address in the one or more junk addresses, wherein each member address in the group member list that classifies the source address as one of the one or more junk addresses is designated as the originator;
replacing the e-mail message with a secured e-mail message as a new message in response to determining that the recipient address is not designated as the originator; and
removing the source address from the one or more junk addresses in response to all of the member addresses in the group member list designated as the originator agreeing that messages from the source address are not junk mail.

15. The computer program product of claim 14 wherein the filtering further comprises:
storing the new message in a server inbox.

16. The computer program product of claim 15 wherein the e-mail message further comprises a body, and the secured e-mail message includes a link to a copy of the body stored in a secure repository.

17. The computer program product of claim 15 further comprising:
determining whether the recipient address designated as the originator has agreed that messages from the one or more junk addresses are junk mail;
deleting the e-mail message in response to determining that the recipient address designated as the originator has agreed; and
removing the originator designation from the recipient address in response to determining that the recipient address designated as the originator has not agreed.

18. The computer program product of claim 14 wherein the group member list further comprises a group type designation as public or private, the public group type designation permits any member to join the group member list and the private group type designation limits membership in the group member list.

* * * * *